United States Patent
Kurtz et al.

(10) Patent No.: US 9,781,609 B1
(45) Date of Patent: Oct. 3, 2017

(54) SELF-DIRECTED MOBILE WIRELESS ACCESS POINTS AND WIRELESS ENDPOINTS FOR WIRELESS TESTING

(71) Applicant: INTERNATIONAL BUSINESS MACHINES CORPORATION, Armonk, NY (US)

(72) Inventors: Rachele S. Kurtz, Cary, NC (US); Charles S. Lingafelt, Durham, NC (US); James W. Murray, Durham, NC (US); James T. Swantek, Canton, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/230,678

(22) Filed: Aug. 8, 2016

(51) Int. Cl.
*H04W 40/00* (2009.01)
*H04W 16/20* (2009.01)
*H04W 24/02* (2009.01)
*H04W 84/12* (2009.01)
*H04W 88/08* (2009.01)

(52) U.S. Cl.
CPC .......... *H04W 16/20* (2013.01); *H04W 24/02* (2013.01); *H04W 84/12* (2013.01); *H04W 88/08* (2013.01)

(58) Field of Classification Search
CPC ..... H04W 84/12; H04W 16/20; H04W 24/02; H04W 88/08
USPC .................. 455/446, 67.11, 423, 424, 456.1
See application file for complete search history.

(56) References Cited

U.S. PATENT DOCUMENTS

| | | | |
|---|---|---|---|
| 6,571,082 B1 * | 5/2003 | Rahman ............. | H04B 17/0087 342/451 |
| 8,638,671 B2 * | 1/2014 | Finlow-Bates ......... | G01S 5/021 370/241 |
| 8,693,397 B2 * | 4/2014 | Ho ........................... | H04B 7/08 370/252 |
| 8,755,770 B2 * | 6/2014 | Haverty ................... | H04K 3/45 102/215 |
| 8,984,107 B2 * | 3/2015 | Fiennnes ............. | H04N 21/4126 709/222 |
| 8,994,591 B2 * | 3/2015 | Dupray ................ | G01C 21/206 342/457 |
| 9,064,341 B2 * | 6/2015 | Hultquist ........... | G01C 21/3667 |
| 9,094,816 B2 | 7/2015 | Maier et al. | |
| 9,303,997 B2 * | 4/2016 | McGavran ............. | G01C 21/00 |
| 9,329,118 B2 * | 5/2016 | Matsuguma ......... | G01N 17/002 |
| 9,414,239 B2 * | 8/2016 | Brunk .................... | H04W 24/00 |

(Continued)

*Primary Examiner* — Marceau Milord
(74) *Attorney, Agent, or Firm* — Griffiths & Seaton PLLC

(57) ABSTRACT

Embodiments for testing a wireless network location by a processor. A collection of candidate wireless network test locations is selected for testing wireless network communication according to defined constraints, conditions, testing parameters, or a combination thereof. A self-directed, mobile wireless access point (WAP) is dispatched to at least one stationary location from the collection. A self-directed, testing receiver may be commanded to progressively move to each candidate test location along a testing route of the collection. The testing attributes relating to wireless network communication performance are measured for each of the candidate test locations along the testing route of the collection. Qualified WAP locations are identified from the candidate test locations based on the measured testing attributes.

20 Claims, 8 Drawing Sheets

(56) References Cited

U.S. PATENT DOCUMENTS

| | | | |
|---|---|---|---|
| 9,464,907 B1* | 10/2016 | Hoareau | G01C 21/3415 |
| 9,538,493 B2* | 1/2017 | Dupray | H04W 64/00 |
| 2015/0274294 A1 | 10/2015 | Dahlstrom | |
| 2015/0312774 A1 | 10/2015 | Lau | |

* cited by examiner

SELF-DIRECTED MOBILE WIRELESS ACCESS POINTS AND WIRELESS ENDPOINTS FOR WIRELESS TESTING

BACKGROUND OF THE TECHNOLOGY

Field of the Technology

The present technology relates in general to computing systems, and more particularly to, various embodiments for testing wireless communication network coverage for optimal placement of wireless access points (WAP) using self-directed, mobile WAPs to improve quality of a computing system.

Description of the Related Art

In today's society, consumers, business persons, educators, and others use various computing network systems with increasing frequency in a variety of settings. With the proliferation of the wide availability of devices (e.g., computers, handheld devices, phones, tablets, and the like) has also come the need to provide various ways to accommodate the increasing amount of wireless communication in the variety of network coverage settings. For example, many devices may communicate with each other via a wireless communication network in both indoor and outdoor settings, but the quality of the wireless communication network signals often times experience significant decreases in performance due to delays, interference, or a variety of environmental factors. Providing quality wireless communication network signals to these devices to increase performance is critical.

SUMMARY OF THE TECHNOLOGY

Various embodiments for testing a wireless network location by at least of portion of one or more processors, are provided. In one embodiment, by way of example only, a method for testing a wireless network location again by a processor, is provided. A collection of candidate wireless network test locations is selected for testing wireless network communication according to defined constraints, conditions, testing parameters, or a combination thereof. A self-directed, testing receiver is dispatched to at least one stationary location from the collection. A self-directed, testing receiver may be commanded to progressively move to each candidate test location along a testing route of the collection. The testing attributes relating to wireless network communication performance are measured for each of the candidate test locations along the testing route of the collection. Qualified WAP locations are identified from the candidate test locations based on the measured testing attributes.

BRIEF DESCRIPTION OF THE DRAWINGS

In order that the advantages of the technology will be readily understood, a more particular description of the technology briefly described above will be rendered by reference to specific embodiments that are illustrated in the appended drawings. Understanding that these drawings depict only typical embodiments of the technology and are not therefore to be considered to be limiting of its scope, the technology will be described and explained with additional specificity and detail through the use of the accompanying drawings, in which.

DETAILED DESCRIPTION OF THE DRAWINGS

Figure 1:
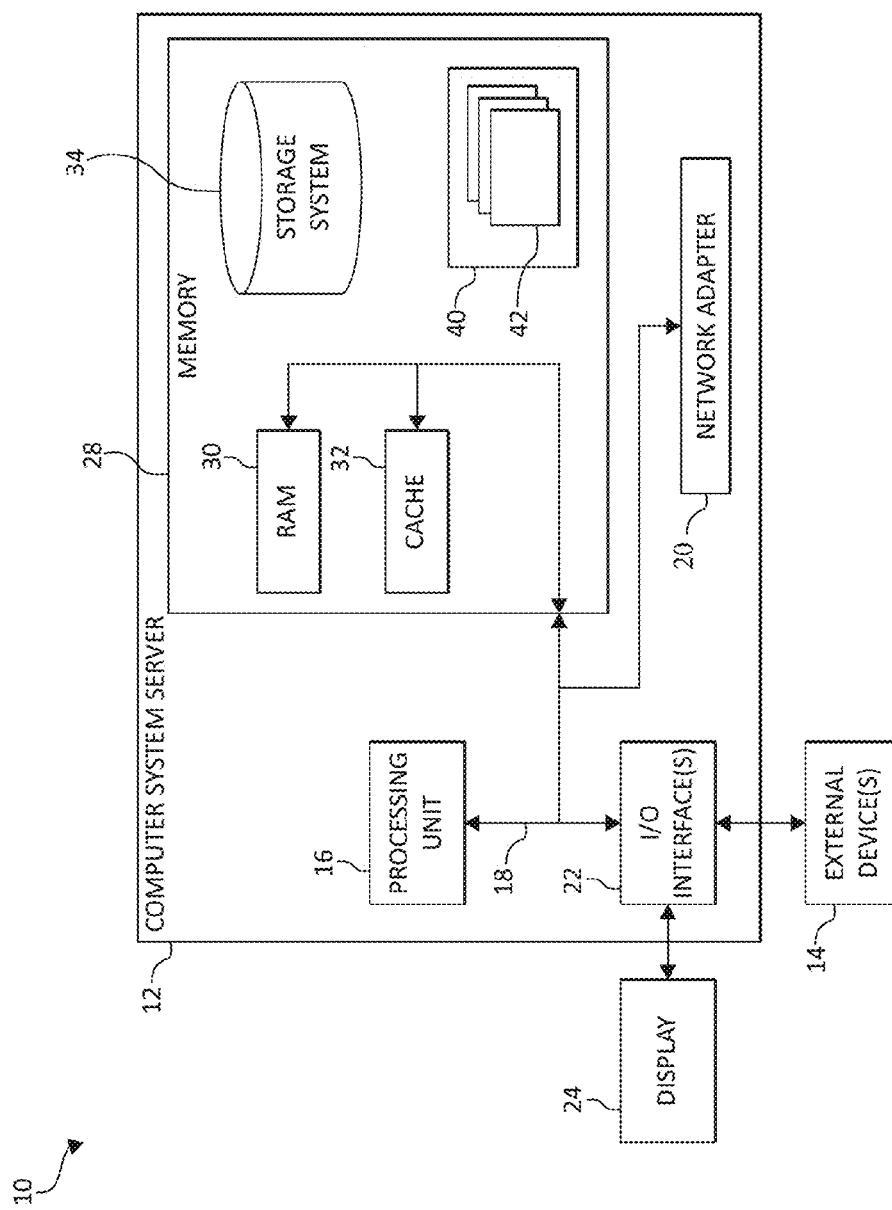
FIG. 1 is a block diagram depicting an exemplary cloud computing node according to an embodiment of the present technology.

As previously indicated, providing devices (e.g., computers, handheld devices, phones, tablets, and the like) quality and increased wireless communication availability and increased signal strength in a variety of network coverage settings for sending or receiving data is increasingly proliferating. Data is increasingly processed through a variety of geographically disbursed computing components, where, for example, a local node may contain a set of data processing components yet remain in remote communication with other portions of the distributed data processing system. To wit, a user's data may not be locally stored or processed on the user's local computer, but is instead hosted by one or more distributed storage components that are in remote communication with the local computer. This type of data storage may, in some cases, be referred to as "cloud," or "cloud-based" storage.

With the proliferation and management of wireless communication access points (WAP) has come a desire for users, such as an administrator or "installer", to better manage their own WAPs. In one aspect, WAP can be a device that acts as a central point between a wireless and a wired network. When multiple WAPs are installed within close proximity, installers must choose proper radio channels to minimize inter-access point interference, which can degrade the performance of a wireless network, such as a local area network (LAN). WAP devices can include automatic channel selection, power settings, signal direction, radio band selection, and signal strength and can sense the presence of other access points and attempts to adjust to a quieter channel.

More specifically, a wireless communication system, such as a wireless fidelity (Wi-Fi) communication system, may be composed of two components: 1) an endpoint receiver (e.g., computers, handheld devices, phones, tablets, sensors, Internet of Things (IoT) devices, and the like), and 2) the wireless access point (WAP). The WAP can be the radio (transmit and receive) of the Wi-Fi system. As in any radio based system, the quality at which wireless communication signals can be conveyed between the WAP and the endpoint can be dependent on many environmental factors or operational factors.

These factors may include radio frequency interference from various sources, interference from other radios, microwaves, cordless phones, Bluetooth devices, signal path interference (e.g., buildings, steel, concrete, wood), distance between a sender and a receiver, an electromagnetic interference, sensitivity (e.g., quality) of the receiver to the signal, signal noise, antenna construction, antenna direction, the number of other endpoints using the same radio channel, or an amount of traffic each endpoint is pushing across a radio channel. As one of ordinary skill in the art will appreciate, "quality" wireless communication signals may be dependent on a number of factors, including such factors of interference caused by physical objects, radio frequency interference, electrical interference, environmental factors, or other factors commonly known to one of ordinary skill in the art.

Modeling the significant factors affecting the quality at which wireless communication signals are delivered and limited system architectures create challenges for delivering the needed wireless communication signal strength, performance, and coverage. Accordingly, a need exists for identifying optimal placement of WAPs for operating Wi-Fi communication systems that will provide devices the expected wireless communication signal strength, performance, and coverage. In one aspect, the present technology provides a solution for creating, implementing, and operating (trouble-shooting) a wireless communication system.

The mechanisms of the illustrated embodiments provide a solution for testing, measuring, and collecting critical data and measurements for a Wi-Fi communication system, particularly prior to building the Wi-Fi communication system. These mechanisms may optimize the Wi-Fi communication system by utilizing one or more self-directed, mobile WAP (e.g., drones) that may identify one or more test locations delivering a highest degree of wireless signal strength, performance, and coverage as compared to other test locations where one or more environmental factors and operational factors are present. In this way, the mechanisms of the illustrated embodiments improve or optimize one or more aspects related to signal strength, performance (both persistent and intermittent), and coverage in a wireless communication network based on measured signal strength information associated with one or more tested locations associated with the wireless communication network.

As will be further described, in various embodiments, the mechanisms of the present technology may select a collection of candidate wireless network test locations for testing wireless network communication according to defined constraints, conditions, testing parameters, or a combination thereof. A self-directed, mobile wireless access point (WAP) may be dispatched to at least one location from the collection. A self-directed, testing receiver may be signaled or commanded to progressively move to each candidate test location along a testing route of the collection. One or more test attributes relating to wireless network communication performance may be dynamically measured or calculated for each of the candidate test locations along the testing route of the collection. One or more qualified WAP locations may be identified, determined, and/or selected from the candidate test locations based on the measured testing attributes.

In one embodiment, a location may be termed herein as a "candidate test location." This location is, in a sense, preliminary, as it provides the mechanisms of the illustrated embodiments with preliminary data that may be calculated, measured, or analyzed about a particular location desired to be determined to be within one or more defined parameters. The mechanisms are then able to glean the preliminary data about the candidate test location by use of a self-directed, mobile WAP and a self-directed, testing receiver, and then compare the preliminary data taken by the self-directed WAP and/or the self-directed, testing receiver, that may be compared to one or more defined constraints, conditions, testing parameters, or a combination thereof. In one aspect, the defined constraints, conditions, testing parameters, or a combination thereof may establish one or more thresholds for determining whether the candidate test location delivers results that may be above or below one or more of the defined thresholds. As one of ordinary skill in the art will appreciate, "measuring", "calculating", or "analyzing" the data captured by a self-directed, mobile WAP and/or a self-directed, testing receiver (e.g., a transceiver and receiver) may be determined in a variety of ways. For example, the one or more mathematical operations (e.g., using addition, subtraction, division, multiplication, standard deviations, means, averages, statistical modeling using statistical distributions, etc.) may be used in the measuring, calculating, or analyzing functional operations. Other examples of this functionality, and corresponding benefits, will be described further herein.

In addition to the mechanisms for wireless network location testing information, the present technology provides for on-site surveying using one or more self-directed, mobile WAP devices and self-directed, testing receiver, which may function as a transceiver and a receiver. For example, a coverage area map that may include one or more candidate WAP placement test locations may be generated according to a coverage area, which may include various environmental and/or operation factors, such as, for example, building design and materials, defined wireless coverage standards, performance and capacity, and user-defined "best practices" for WAP placement.

Accordingly, one or more self-directed, mobile WAP devices may be signaled or dispatched to a selected candidate test location. The one or more self-directed, mobile WAP devices may be temporarily placed at the candidate test location to generate the Wi-Fi signals. In one aspect, the one or more self-directed, mobile WAP devices may include one or more processors, memory, computing circuitry, wireless communication technology, and/or transceivers or receivers which may function independently and/or in conjunction with each other, to function as a Wi-Fi Signal Generator.

For example, self-directed, testing receiver devices (e.g., a Wi-Fi Signal Receiver) may measure the signal from a Wi-Fi Signal Generator of a one or more self-directed, mobile WAP devices (e.g., a Wi-Fi Signal Generator) and may then move around a defined coverage area collecting performance data at one or more candidate test locations. One or more of the self-directed, mobile WAP devices and/or one or more self-directed, mobile receiver devices, functioning as the Wi-Fi Signal Generators and/or the Wi-Fi Signal Receivers, may be signaled to progressively move to another candidate test location on the coverage area map to collect the performance data. If one or more of the self-directed, testing receiver devices, functioning as a Wi-Fi Signal Receiver, does not receive Wi-Fi signals, such as a defined signal strength or frequency thresholds, within a defined performance range, then the one or more self-directed, mobile WAP devices, functioning as the Wi-Fi Signal Generator, may be dispatched to move to an alternative area scanned again by the one or more self-directed, testing receiver devices, functioning as the Wi-Fi Signal Receiver, to identify an optimal Wi-Fi Signal Generator placement, and thus Access Point (AP) placement.

In an additional aspect, the mechanisms of the embodiments provide predictive analysis. That is, as data is inputted into a Wi-Fi analysis tool (or decision module) to determine optimal Wi-Fi Access Point placement for intended coverage areas, vendor access point platform models and radio types, building design and materials, performance and capacity targets, and/or the quantity and types of client Wi-Fi devices, and the like. If a test environment currently has existing Wi-Fi coverage, then performance data and coverage maps for the existing test environment can also be inputted. The Wi-Fi analysis tool or "decision module" may use all the information to produce a map for optimal access WAP placement according to the defined constraints, conditions, testing parameters, or a combination thereof and what an expected signal performance and coverage would be for the intended area based on that Access Point placement. Thus, the mechanisms of the embodiments can project the performance data at a candidate WAP that one or more self-directed, testing receiver devices, functioning as a Wi-Fi Signal Receiver, may experience based on the Wi-Fi Signal Generation for the access point mapping. Thus, the present technology provides increased computing efficiency to computing performance since collected or calculated measurement provides for architecting a Wi-Fi communication system that characterizes one or more signal coverage challenges, identifies potential solutions, and provides a variety of signal coverage WAP location solutions.

The benefits for identifying optimized WAP placement locations compared to alternative WAP placement locations provide increased computing performance for devices using the WAP. Moreover, these improvements also include end-user perceived quality of the Wi-Fi signal which may also increase one or more computing services provided by end-users of the WAP. The ability to identify a highest quality signal coverage of a wireless access point placement using a self-directed, mobile WAP, such as a drone, also increases computing performance and WAP coverage, decreases computing down time, and reduces computing diagnostic support or expenses.

It is understood in advance that although this disclosure includes a detailed description on cloud computing, implementation of the teachings recited herein are not limited to a cloud computing environment. Rather, embodiments of the present technology are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the technology described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the technology.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the technology as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
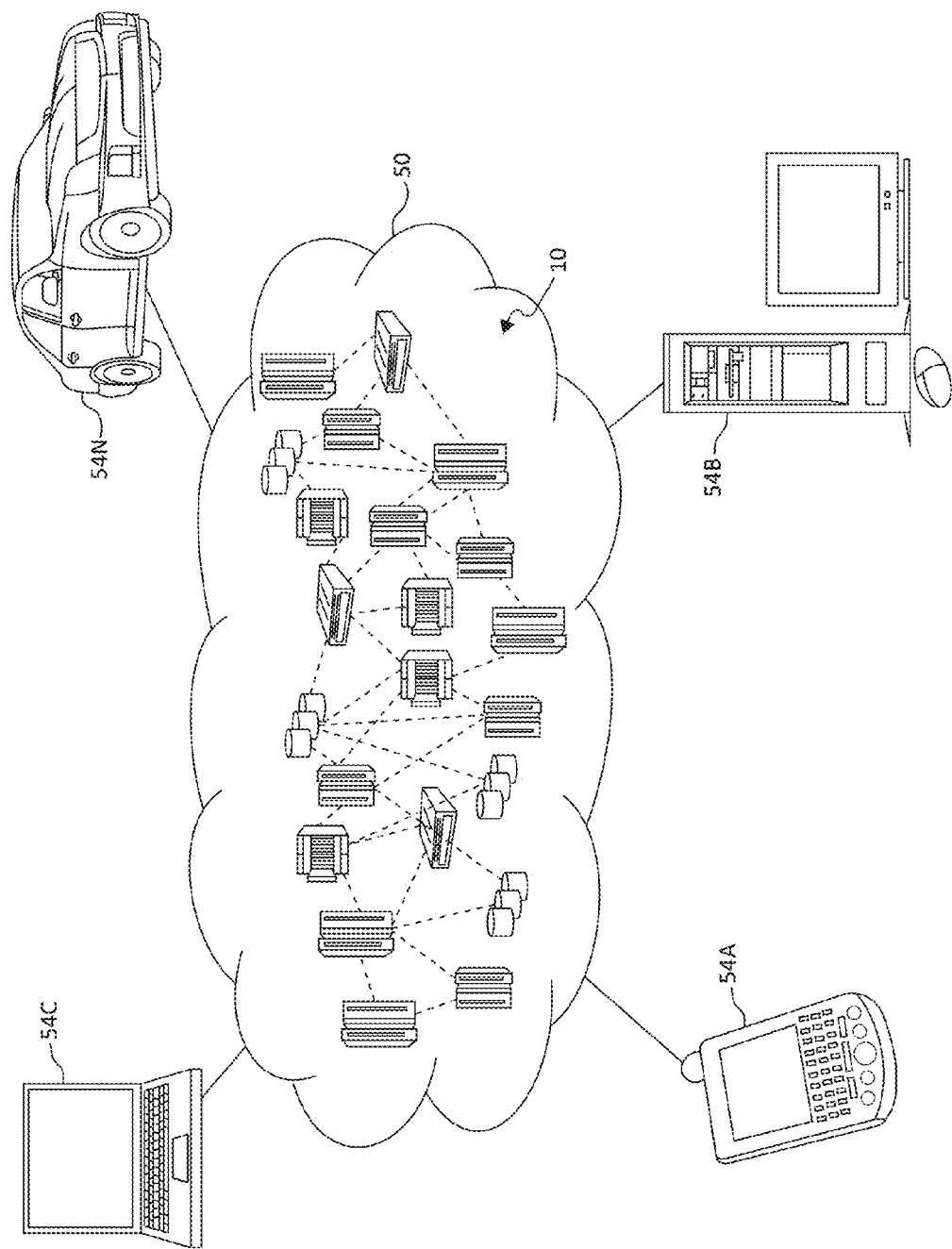
FIG. 2 is an additional block diagram depicting an exemplary cloud computing environment according to an embodiment of the present technology.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
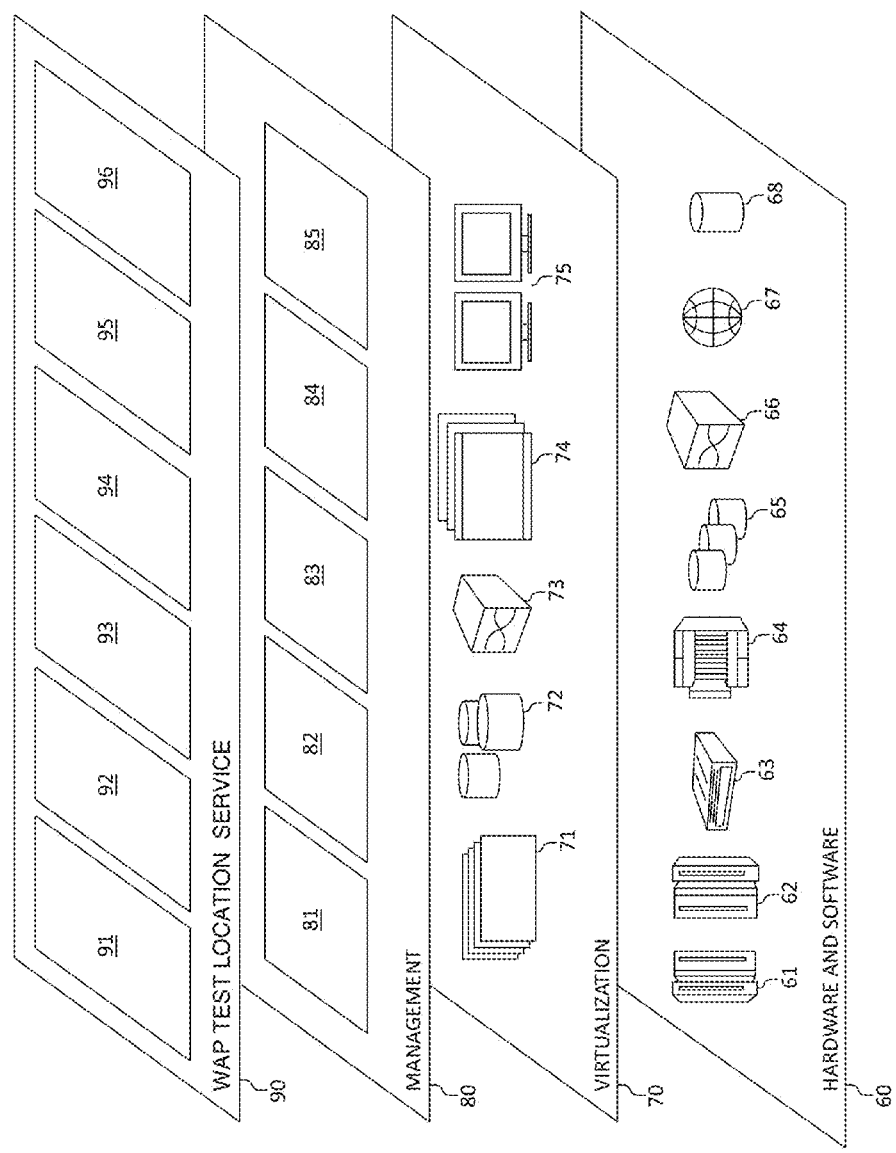
FIG. 3 is an additional block diagram depicting abstraction model layers according to an embodiment of the present technology.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the technology are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

WAP test location service workload layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present technology, various wireless network location testing workloads and functions 96. In addition, wireless network location testing workloads and functions 96 may include such operations as test attribute data analytics, test attribute data analysis, and as will be further described, user and device management functions. One of ordinary skill in the art will appreciate that the wireless network location testing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present technology.

As previously mentioned, the mechanisms of the illustrated embodiments provide novel approaches for the improvement of wireless network location testing by, among other aspects, automated remote configuration ("remote control") of device settings, positioning, and other factors based, at least in part, on data obtained from the wireless network location testing subjects previously tested.

In one embodiment, the configuration settings may be selected based on a variety of wireless network location testing information. This information may include among other details, for example, the testing attributes and results according to defined constraints, conditions, testing parameters, or a combination thereof, and the like. As previously mentioned, the wireless network location testing information may be measured, calculated, or analyzed from the self-directed, testing receiver device as well as supplemental data about the particular wireless network location.

Figure 4:
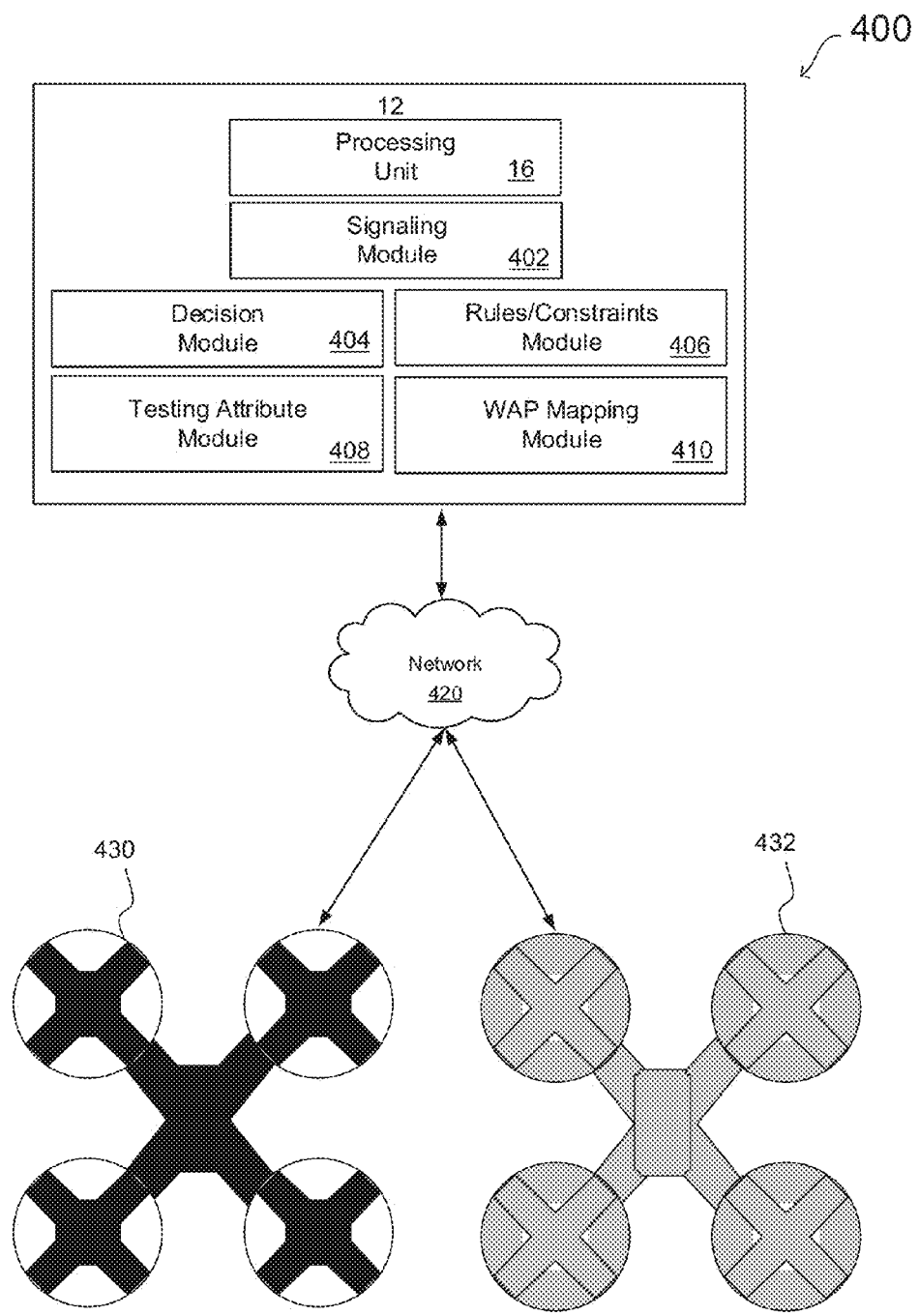
FIG. 4 is an additional block diagram depicting various user hardware and cloud computing components functioning in accordance with aspects of the present technology.

Turning now to FIG. 4, a block diagram depicting exemplary functional components 400 according to various mechanisms of the illustrated embodiments, is shown. In one aspect, each of the components, modules, and/or functions described in FIGS. 1-3 may also apply to the components, modules, and functions of FIG. 4. Computer system/server 12 is again shown, incorporating processing unit 16 to perform various computational, data processing and other functionality in accordance with various aspects of the present technology. A signaling module 402 is shown, along with a decision module 404, rules/constrains module 406, a testing attribute module 408, and a WAP mapping module 410.

As one of ordinary skill in the art will appreciate, the depiction of the various functional units in computer system/server 12 is for purposes of illustration, as the functional units may be located within computer system/server 12 or elsewhere within and/or between distributed computing components. For example, the computer system/server 12 may be a controller connected to one or more WAP and may control one or more WAPs and provide automatic adjustments to RF power, channels, authentication, and security.

The signaling module 402 may receive, process, or transmit one or more signals. That is, the signaling module may include a transceiver for transmitting a signal, a receiver for receiving a signal, or a sensor for sensing a direction towards which the signal is transmitted or received.

The signaling module 402, the decision module 404, the rules/constraints module 406, testing attribute module 408, and the WAP mapping module 410 may work in concert with processing unit 16 to accomplish various aspects of the present technology. For example, signaling module 402 and the rules/constraints module 406, which may include defined constraints, conditions, testing parameters, or a combination thereof, may undergo various data analytics functions to signal one or more self-directed, mobile WAP devices, such as self-directed, mobile WAP devices 430 or 432, to at least one or more candidate test locations along a testing route of a map generated by WAP mapping module 410 to dynamically measure the testing attributes relating to wireless network communication performance for each of the candidate test locations along the testing route.

Decision module 404 may make decisions in conjunction with the testing attribute module 408 to identify qualified WAP locations from the candidate test locations based on the measured testing attributes. As one of ordinary skill in the art will appreciate, the decision module 404 and testing attribute module 408 may implement mathematical modeling, signal processing, or other data processing technologies to carry out the various mechanisms of the illustrated embodiments.

FIG. 4's components 400 as shown may include a number of self-directed, mobile WAP devices, including a self-directed, mobile WAP device 430 and a self-directed, testing receiver device 432. The self-directed, mobile WAP device 430 and the self-directed, testing receiver device 432 are connected via communications channels (e.g., bus 18) through the network to the computer system/server 12 as shown. In one exemplary embodiment, a self-directed, mobile WAP device 430 and/or the self-directed, testing receiver device 432 may be in a candidate location for calculating or measuring WAP data. The self-directed, mobile WAP device 430 and/or the self-directed, testing receiver device 432 may have already located, and connected to, a wireless network 420. The self-directed, mobile WAP device 430 and/or the self-directed, testing receiver device 432 may then connect through the wireless network 420 through the Internet to the computer system/server 12 to provide dynamically measured testing attributes or data relating to wireless network communication performance of the self-directed, mobile WAP device 430 and/or the self-directed, testing receiver device 432 at the candidate test location along the testing route. In turn, the self-directed, mobile WAP devices 430 and/or 432 may receive configuration information, signal information, settings information and/or instructions from the computer system/server 12.

In one aspect, the self-directed, mobile WAP device 430 and/or the self-directed, testing receiver device 432 may incorporate additional functional components of a WAP or drone, such as, for example, one or more processors or memory. The self-directed, mobile WAP device 430 and/or the self-directed, testing receiver device 432 may also include the signaling module 402, the decision module 404, the rules/constraints module 406, testing attribute module 408, and the WAP mapping module 410 to accomplish specific functionality to further the mechanisms of the illustrated embodiments.

In operation, by way of example only, the decision module 404 may select a collection of candidate wireless network test locations identified on a map generated by the WAP mapping module 410, for testing wireless network communication according to defined constraints, conditions, testing parameters, or a combination thereof received by the rules/constraints module 406 from a user. The signaling module 402 may dispatch, command, or signal the self-directed, mobile wireless access point (WAP) 430 (functioning as a Wi-Fi signal generator) to at least one location, such as a candidate wireless network test locations. The signaling module 402 may dispatch, command, or signal the self-directed, testing receiver device 432 (functioning as a Wi-Fi signal receiver) to progressively move to each candidate test location along a testing route of the collection. The testing attribute module 408, working in conjunction with the self-directed, testing receiver device 432 (functioning as a Wi-Fi signal receiver) may dynamically measure the testing attributes relating to wireless network communication performance for each of the candidate test locations along the testing route of the collection. The decision module 404 may identify qualified WAP locations from the candidate test locations based on the measured testing attributes. In one aspect, a qualified WAP location may be defined as a WAP that provides wireless access coverage, signal strength, performance, and/or capabilities greater than other WAP locations.

In an additional aspect, the computer system/server 12 may function as a centralized controller that may distribute one or more self-directed, mobile wireless WAP devices or self-directed, testing receiver devices (e.g., a drone) having capabilities to simulate a wireless LAN environment. The computer system/server 12 may gather required Access Point location information, and analyze tested data to identify performance and optimization data to generate a tactical design placement for providing increased wireless LAN service, such as within a building or facility where interference can hinder the wireless LAN service.

In one aspect, the mechanisms of the embodiments provide improvements in computing efficiency and quality of service. For example, the mechanisms of the embodiments may provide an on-demand site survey with use of a self-directed, mobile WAP and/or a self-directed, testing receiver device that may identify the quality of signal strength, provide a greater number of candidate test locations, increased ability to measure all of the points under load, interactions of multiple candidate test locations which can be moved to enable another test with alternative candidate test location interactions. In this way, optimized access point locations can be identified to provide a dynamic setup operation of a wireless LAN, dynamic testing to existing wireless LANs, and provide instantaneous feedback to provide optimized wireless LAN solutions.

In one aspect, the mechanisms of the embodiments enable measurements and WAP placement simulation in physical spaces that may be unable to be tested due to one or more physical constraints. For example, in a building with a multi-floor atrium, the optimal placement of the WAP may be several floors up on a wall where current testing methods are unable to reach. Thus, the mechanisms of the embodiments provide a solution via a mobile WAP device (e.g., WAP drones) and a self-directed, testing receiver device (e.g., a receiver drone) to conduct these measurements and selection of optimal WAP placement. By using the self-directed, testing receiver drones, a central control can identify specific location experiences wireless LAN coverage problems and take one or more measurements to create a wireless LAN coverage solution.

Figure 5:
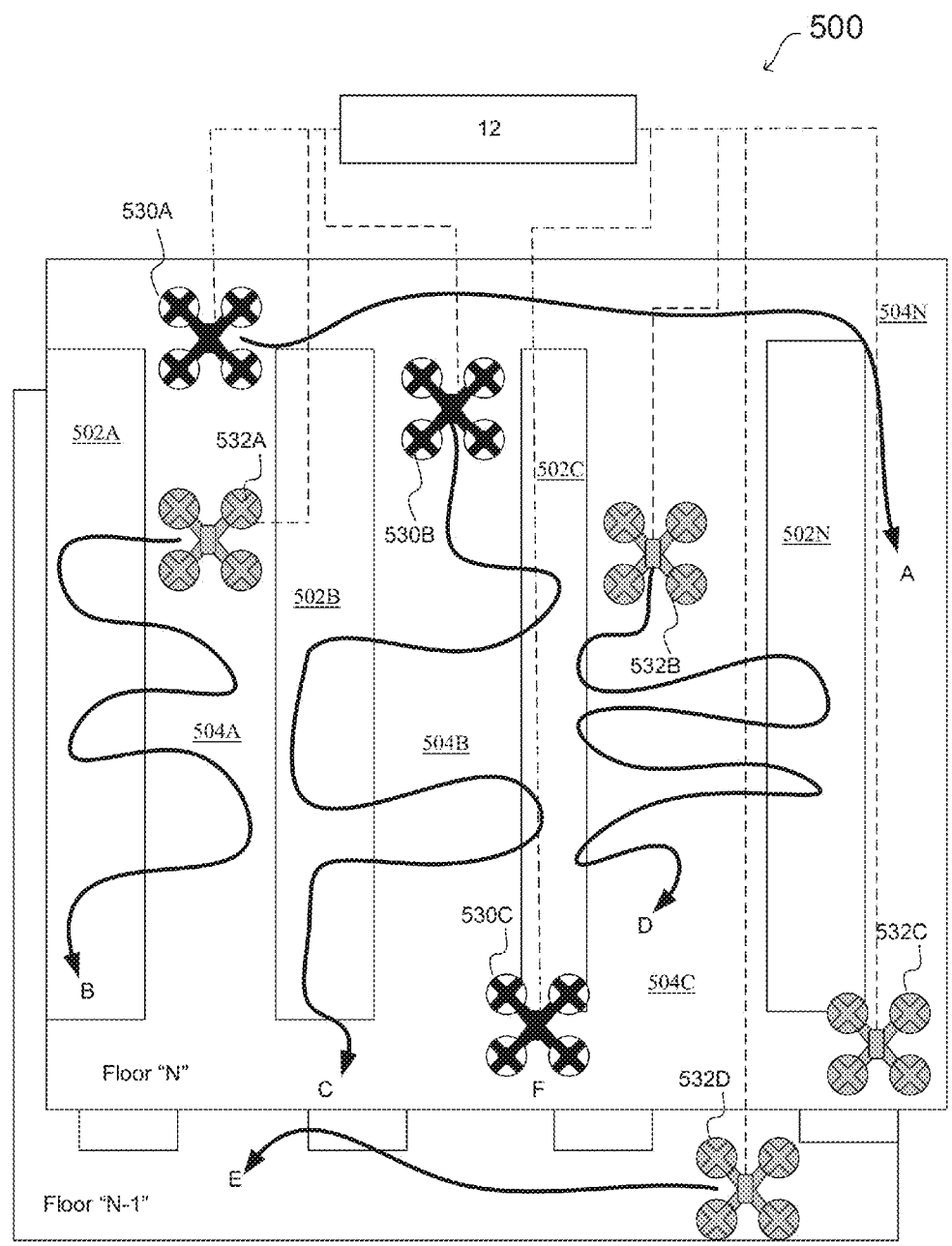
FIG. 5 is an additional block diagram depicting an exemplary functional relationship between various aspects of the present technology.

Turning now to FIG. 5, a diagram of exemplary wireless LAN testing environment 500 relating to testing a wireless network location using mobile WAPs is depicted, for use in the overall context of intelligent image enhancement according to various aspects of the present technology. As shown, the various functionality or "modules" of functionality, in the same descriptive sense as has been previously described in FIG. 4 may be included in FIG. 5. With the foregoing in mind, the wireless LAN testing environment 500 may also be incorporated into various hardware and software components of central controller 12 (e.g., computer system/server 12 of FIG. 1) and/or mobile WAPs 530 or self-directed, testing receiver devices 532 (e.g., 530A, 530B, 530C or WAPs 532A, 532B, 532C, 532D which may be collectively referred to herein as "530" and/or "532" respectively) in accordance with the present technology. Many of the functionality may execute as background processes on various components, either in distributed computing components, or on the user device, or elsewhere, and generally unaware to testing a wireless network location using mobile WAPs. In one aspect, each of the components, modules, functions, embodiments, operations, and/or services described in FIGS. 1-4 may also apply to the components, modules, and services of FIG. 5.

Consider the following example of an implementation of the aforementioned functionality for the wireless LAN testing environment 500. The wireless LAN testing environment 500 includes one or more walls 502A-502N (which may be herein after collectively referred to as "502"), one or more halls 504A-504N, which may be herein after collectively referred to as "504") on Floor "N", which may be above Floor "N−1" (which also may be labeled as floor −1 or 00 according to user preference). In one aspect, the central controller 12 may control the actions, movements (indicated by solid arrow lines), functionality, and/or performance of one or more self-directing mobile devices (which may be self-directed WAP drones, such as WAPs 530A, 530B, 530C and self-directed, testing receiver devices 532A, 532B, 532C, 532D. By way of example only, the central controller 12 may be located external and/or internal to the coverage area designed to be tested (e.g., a building). In one aspect, WAPs 530A, 530B, 530C may be transmitter WAPs and/or self-directed, testing receiver devices 532A, 532B, 530C may be receiver devices for the WAPs 530A, 530B, 530C. In one aspect, WAPs 530A, 530B, 530C may be in an initial stationary location. For illustration purposes, self-directed, testing receiver device 532D is depicted on the floor N−1, measuring the attributes of Wi-Fi emanations from floor N.

In one aspect, the WAPs 530A, 530B, 530C (e.g., WAP drones) may simulate a WAP. The self-directed, testing receiver devices 532A, 532B, 532C, 532D (e.g., receiver drones) may simulate an end-user device (e.g., computer, tablet, hand held devices, mobile phones, smartphone, laptop, security camera, etc.). It should be noted that mobile WAPs 530, and self-directed, testing receiver devices 532 may be stationary or airborne, or a combination thereof for performing the functionality described herein. For example, WAPs 530, and self-directed, testing receiver devices 532 may be airborne a selected time period while testing a candidate location to determine suitable or defined wireless LAN coverage capabilities, wireless communication signal strength, performance, and/or interference levels or other Wi-Fi attributes. The WAPs 530 and self-directed, testing receiver devices 532 may also land and remain in a stationary or fixed position for an additional selected period of time and continue testing the candidate location to determine suitable or defined wireless LAN coverage capabilities, wireless communication signal strength, performance, and/ or interference level measurements or other Wi-Fi attributes. As an example, if the receiver drone, such as self-directed, testing receiver device 532C was investigating an intermittent problem with a specific user, the self-directed, testing receiver device 532C may land adjacent to the user and remain there for many hours, taking the hours of measurements required to "catch" or identify, and then characterize the intermittent problem. In one aspect, each of the mobile WAPs 530 and self-directed, testing receiver devices 532 may traverse from one location to another location along a testing route and test at locations along the route or test continually along the route. For example, mobile WAP 530A may move from a stationary start location to point A. Mobile WAP 530B may move from a stationary start location to point C. Self-directed, testing receiver devices 532A may move from a stationary start location to point B. Self-directed, testing receiver devices 532B may move from a stationary start location to point D. Self-directed, testing receiver devices 532D may move from a stationary start location to point E.

Consider the following example of an implementation of the aforementioned functionality.

Preparation Phase

Central Controller

In one aspect, a user, such as an administrator, may 1) define one or more of the following. The user may define an allowable (3-D) space for movement of the mobile WAPs 530 and self-directed, testing receiver devices 532 (e.g., such as floors N and N−1 of a building). The defined space may represent one or more locations accessible for testing by the mobile WAPs 530 and self-directed, testing receiver devices 532 for which wireless coverage is to be determined. In one aspect, the self-directed, testing receiver devices 532A-D may be receiver drones. The user may define the density of a self-directed, testing receiver drone measurements to establish a receiver test grid and test location points. The user may define the density of WAP test points, which defines a minimum space between candidate WAP test locations, such as, for example, two locations in hall 504A as candidate test locations, or WAP candidate locations are to be at least "x" distance apart, where "x" is a numerical value (e.g., at least 20 feet apart). The user may define a number of WAPs drones and self-directed, testing receiver devices to be employed in the testing environment (e.g., a number of WAPs 530 drones functioning as Wi-Fi signal generators and self-directed, testing receiver devices 532 functioning as receiver drones).

In one aspect, a user, such as an administrator, may 2) define one or more mobile WAP placement constraints for WAP placement optimization. The user may define physical constraints for placement of the WAPs drones (e.g., mobile WAPs 530A-C drones functioning as Wi-Fi signal generators), such as minimum and maximum vertical heights, a minimum distance from openings (e.g., doors, halls, lobbies), a minimum distance from other types of objects in the space, such as fire sprinklers, lights, alarms, signs, speakers, air conditioning openings, elevators, windows, doors, etc. The user may define radio spectrum constraints, such as minimum and maximum signal strength, directionality of signal, a number of channels, and channel limitations. The user may define facility infrastructure constraints, such as power, wired network connectivity, and the like. The user may define sources of radio interference, such as, for example, power substations or electrical devices that may cause radio interference. The user may define WAP redundancy requirements.

In one aspect, a user, such as an administrator, may 3) define the self-directed, testing receiver drone (e.g., self-directed, testing receiver devices 532A-N) test constraints. For example, the user may define physical constraints, such as minimum and maximum vertical heights, a minimum distance from openings (e.g., doors, halls, lobbies, and the like), a minimum distance from other types of objects in the space, such as fire sprinklers, lights, alarms, signs, speakers, air conditioning openings, elevators, windows, doors, etc. The user may define organizational constraints, such as, for example "at least 3 executive offices on floor N must have additional capabilities or different attributes (such as increased signal strength, increased performance and capacity, or redundancy) as compared to other non-executive offices".

In one aspect, a user, such as an administrator, may 4) define test attributes and success conditions. For example, the user may define a minimum signal strength, signal to noise ratio, coverage area and a maximum signal interference for various Wi-Fi frequency bands and channels (e.g., for an entire building, floor, or each candidate test location). The user may define, for dynamic testing, movement patterns, rates of velocity or acceleration of the self-directed, testing receiver drones (e.g., travel speed of receiver drone, height, or route). The user may define application attributes for each applicable application. For example, for a Voice over Internet Protocol (IP)/(VoIP) service, application attributes may include a maximum number of dropped packets, a maximum jitter, or a maximum number of dropped calls. For a video streamlining application, application attributes may include a maximum number of dropped frames. For audio streaming, application attributes may include a maximum number of dropped packets. For data transport, application attributes may include a minimum rate.

Operational Phase
Optimal WAP Placement Determination

In one aspect, a controller 12, such as computer system/server 12 that may be a central controller, may determine a collection of candidate test locations for the mobile WAPs and self-directed, testing receiver devices that are within physical and facility constraints, given the WAP candidate density. For each candidate WAP test location, the controller 12 may command WAP drone(s) to move to candidate location(s). For example, the controller 12 may issue commands to WAPs 530 and self-directed, testing receiver devices 532 to move to a section of floor N or floor N−1. Each WAP drone and self-directed, testing receiver drone (e.g., WAPs 530 and self-directed, testing receiver devices 532) may enter into WAP operational testing mode. Each WAP drone may optionally establish "communication link" (see dotted line connecting each WAPs 530 and self-directed, testing receiver devices 532 back to controller 12 in FIG. 5) for sending/receiving data between the controller and/or other WAP drone. The controller 12 may command one or receiver drones (e.g., self-directed, testing receiver device 532) to be adjacent to one or more candidate WAP drones (e.g., WAP drones 530). For example, self-directed, testing receiver device 532A may be initially located in hall 504A adjacent to WAP 530A in hall 504A between walls 502A and 502B. Self-directed, testing receiver device 532B may be initially located in hall 504B adjacent to WAP 530B in hall 504B. Self-directed, testing receiver devices 532C may be initially located on wall 502N in hall 504N adjacent to WAP 530C in hall 504B but positioned on wall 502C. The controller 12 may command receiver drone(s) (e.g., self-directed, testing receiver device 532) to progressively move to each point on a receiver test grid or "testing route", measuring test attributes at each test point. For example, self-directed, testing receiver drones 532A and 532B may be signaled to progressively move (depicted as the solid black line) to each point on the test route and ending at points B and C. If a capacity test is required, then the self-directed, testing receiver drones or controller 12 may perform a data transfer test (e.g., with data being greater than a defined number of bites), using a communication link by the WAP drone if required. Alternatively, the WAP drones 530 or the self-directed, testing receiver devices 532 may source all data themselves. The controller 12 may determine a collection of qualified WAP locations based on the defined test attributes, test success criteria, other constraints, or signal coverage and signal power thresholds. If no qualified WAP locations satisfy the defined test attributes, test success criteria, other constraints, or signal coverage and signal power thresholds, a report may be generated indicating failure to identify qualified WAP locations.

Dynamic Movement Testing of WAP Placement

In one aspect, the controller 12 may determine a physical location of mobile WAPs and self-directed, testing receiver devices that may be predefined or determined according to the actions or steps described above for optimal WAP placement determination. The controller 12 may determine the testing route of the receiver drones (e.g., self-directed, testing receiver devices 532). If existing mobile or non-mobile WAPs (functioning as Wi-Fi signal generators) currently in the testing location are to be used, the controller 12 can configure the existing WAPs to communicate with the receiver drones, one or more of the self-directed, testing receiver devices 532. If WAP drones (e.g., mobile WAP 530 or self-directed, testing receiver devices 532) are to be used, the controller 12 may command the WAP drone(s) to a respective initial placement location. The WAP drone(s) (e.g., mobile WAPs 530 or self-directed, testing receiver devices 532) may utilize an "upstream feed source" that may or may not be associated with the controller 12, the WAP drone(s) may establish an additional communication link to the upstream feed source. In one aspect, the "upstream feed source" may be an enterprise's existing servers, other infrastructure, and/or the controller 12. Also, the term "communication link" may be one or more of a variety of communication link technologies, such as infrared, microwave, point-to-point radio links, and/or other communication links commonly known to one of ordinary skill in the art. This "upstream feed source" may be or may represent any data flow which is desired to be tested, such as a file transfer, a video stream, an audio stream, an interactive connection.

The controller 12 may command one or more receiver drones, such as self-directed, testing receiver devices 532, to start testing a testing route of the test environment. The controller 12 may issue a signal to command the receiver drones, such as self-directed, testing receiver devices 532, to begin testing, progressively moving along the testing route at a predefined movement rate. The receiver drones may initiate one or more test(s), collect and measure sampled data at the candidate test locations, analyze test results (e.g., signal strength, lost video packets), and convey the test results to central controller. The test results may be received and/or processed to identify location with test results that fail to meet the threshold.

In one aspect, the optimal WAP Placement determination and Dynamic Movement Testing of WAP Placement operations as described herein may be used iteratively in that at first the optimal placement for mobile WAPs may be insufficient to satisfy the dynamic testing success requirements, which would then result in an additional constraint in determining the optimal WAP placement. The Optimal WAP Placement Determination may then be performed again to identify a more improved WAP placement that provides increased wireless communication coverage, higher signal strength, better wireless performance for sending or receiving data as compared to other determined WAP or self-directed, testing receiver device placement locations. This operation may then be followed by the Dynamic Movement Testing of WAP or self-directed, testing receiver device placement operation to validate new candidate locations of the mobile WAPs or testing receiver devices.

For those skilled in the art, the Dynamic Movement Testing of WAP or test receiver placement may be configured so that that the receiver drones (e.g., self-directed, testing receiver devices 532) do not travel, but traverse a specific location and conduct one or more tests at a candidate location.

For those skilled in the art, the Dynamic Movement Testing of WAP/test receiver placement may be used independently of any WAP placement activity, to identify and clarify problems with existing wireless systems. For example, mechanisms of the embodiments may be used to investigate a user complaint of a Wi-Fi connection issue by directing a self-directed, testing receiver device to travel to the complaint location having the connection issue and remain at or near the complaint location and perform one or more tests. These tests may include measuring a radio signal strength, packet loss, or other measurements useful to identify and characterize the source of the user complaint of the Wi-Fi connection. Such operations are particularly useful and provide enhanced improvement over the current state of when the problem is intermittent. The one or more tests can occur for a defined period of time to capture, measure, and identify one or more Wi-Fi connection issues.

Figure 6:
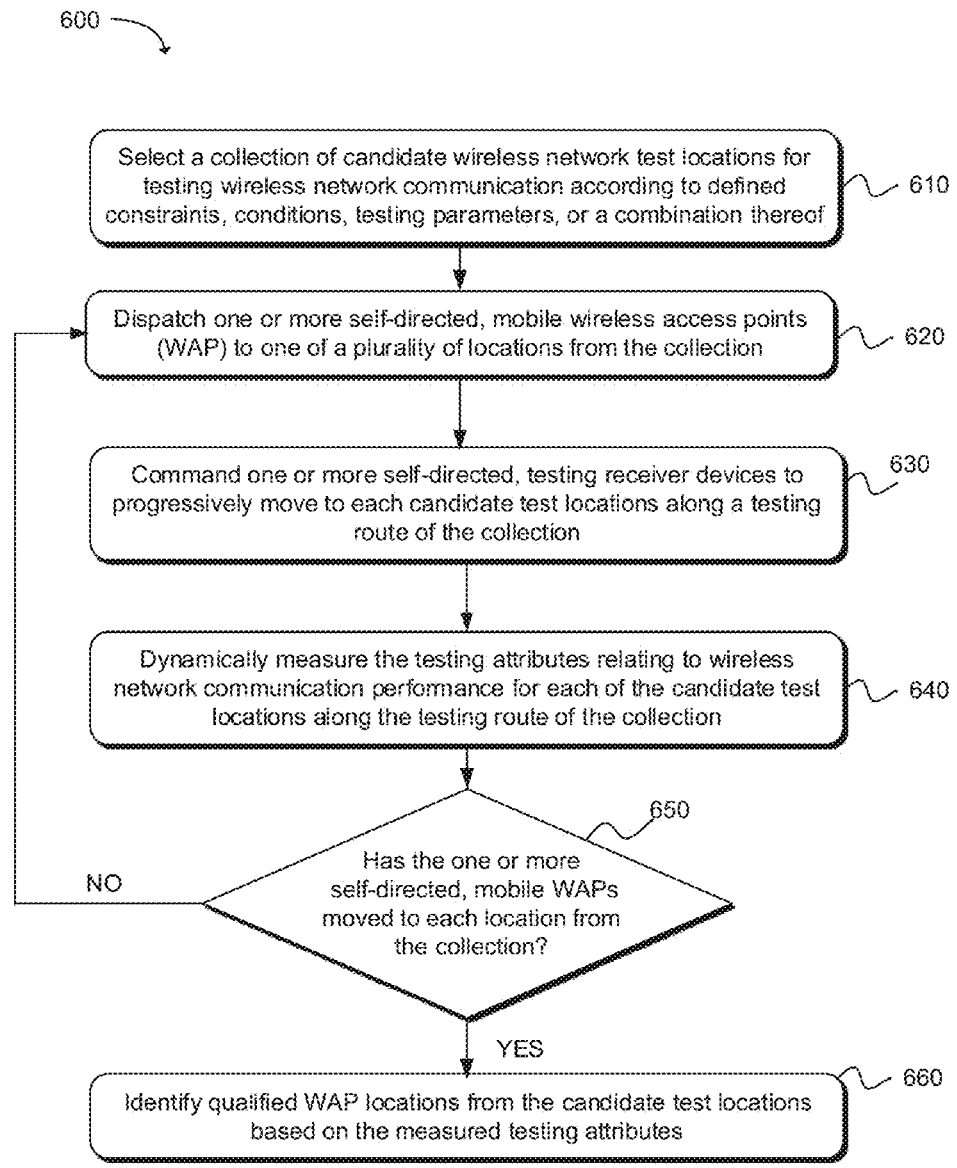
FIG. 6 is a flowchart diagram depicting an exemplary method for testing a wireless network location by a processor, in which aspects of the present technology may be realized.

Turning now to FIG. 6, a flowchart of an example method 600 for testing a wireless network location according to an example of the present technology. The functionality 600 may be implemented as a method and executed as instructions on a machine, where the instructions are included on at least one computer readable medium or one non-transitory machine-readable storage medium. For example, starting in block 610, a collection of candidate wireless network test locations may be selected for testing wireless network communication according to defined constraints, conditions, testing parameters, or a combination thereof. A self-directed, testing receiver device may be dispatched to at least one stationary location from the collection, as in block 620. A self-directed, testing receiver may be commanded to progressively move to each candidate test location along a testing route of the collection, as in block 630. The testing attributes relating to wireless network communication performance may be measured for each of the candidate test locations along the testing route of the collection, as in block 640. At block 650, a determination is made as to whether the one or more self-directed, mobile WAPs have moved to each candidate wireless network test collection. If no at block 650, the functionality 600 may return to block 620 (e.g., in order for the self-directed, mobile WAP to move to a second, third, fourth, and/or "nth" location.). That is, a first iteration of block 620 may be for a first location, a second iteration of block 620 may be for a second location, and third iteration of block 620 may be for an "nth" location). For example, a self-directed mobile WAP may be commanded to a first location. The self-directed test receivers may then move to each of the test locations. The testing attributes relating to wireless network communication performance may be measured for each of the candidate test locations along the testing route of the collection. The self-directed mobile WAP may then move to a second location and the self-directed test receivers may then move to each of the test locations. The testing attributes relating to wireless network communication performance may be measured for each of the candidate test locations along the testing route of the collection. The self-directed mobile WAP may be commanded to a third location. The self-directed test receivers may then move to each of the test locations. This process may be repeated until all of the test locations for the mobile WAP have been completed. In short, blocks 620, 630, 640 may be repeated for each WAP location. If yes at block 650, the functionality 600 may move to block 660. Qualified WAP locations are identified from the candidate test locations based on the measured testing attributes, as in block 660. There can be multiple sets of mobile WAPs and receivers each set following this flowchart simultaneously, either independently of each other, or in conjunction or coordination with each other.

Figure 7:
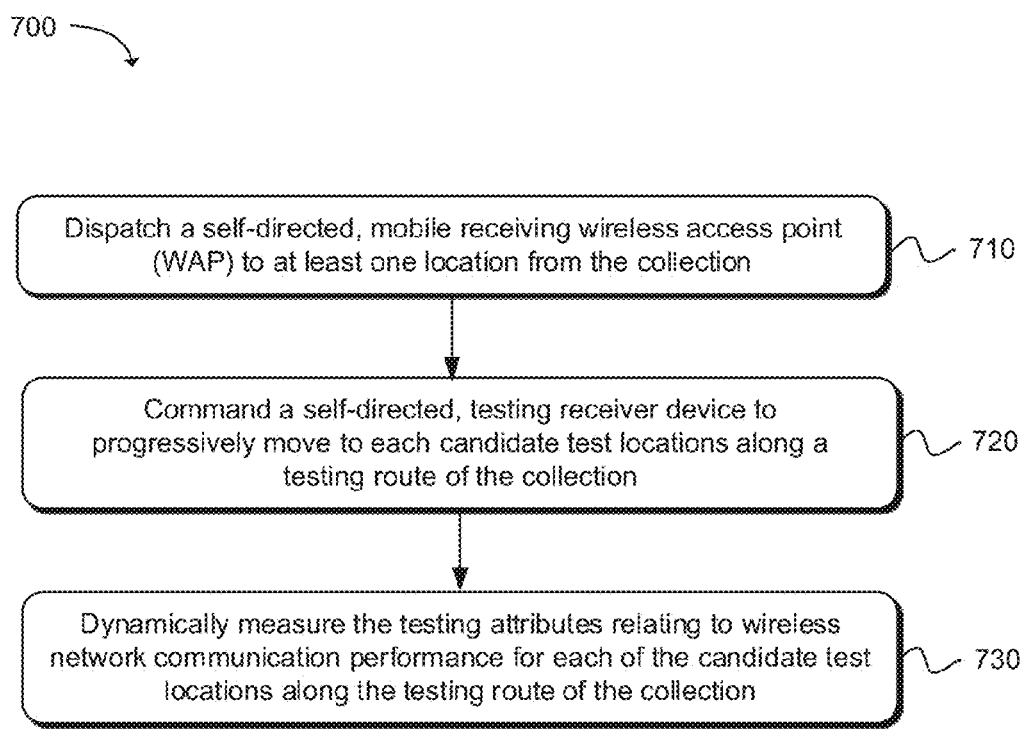
FIG. 7 is an additional flowchart diagram depicting an additional exemplary method for testing a wireless network location for identifying location placement for a wireless access point (WAP) by a processor, again in which aspects of the present technology may be realized.

Turning now to FIG. 7, a flowchart of an example method 700 for testing a wireless network location for identifying location placement for a wireless access point (WAP) according to an example of the present technology. The functionality 700 may be implemented as a method and executed as instructions on a machine, where the instructions are included on at least one computer readable medium or one non-transitory machine-readable storage medium. For example, starting in block 710, a self-directed, mobile wireless access point (WAP) may be dispatched (e.g., signaled to locate) to at least one location from the collection. A self-directed, testing receiver may be commanded to progressively move to each candidate test location along a testing route of the collection, as in block 720. One or more testing attributes may be dynamically measured relating to wireless network communication performance for each of the candidate test locations along the testing route of the collection, as in block 730. In one aspect, upon completion of block 730, blocks 710, 720, and 730 may be repeated up until an "n" number of times in order for the self-directed, mobile WAP to move to each location from the collection for testing the wireless network communication ability using a WAP.

Figure 8:
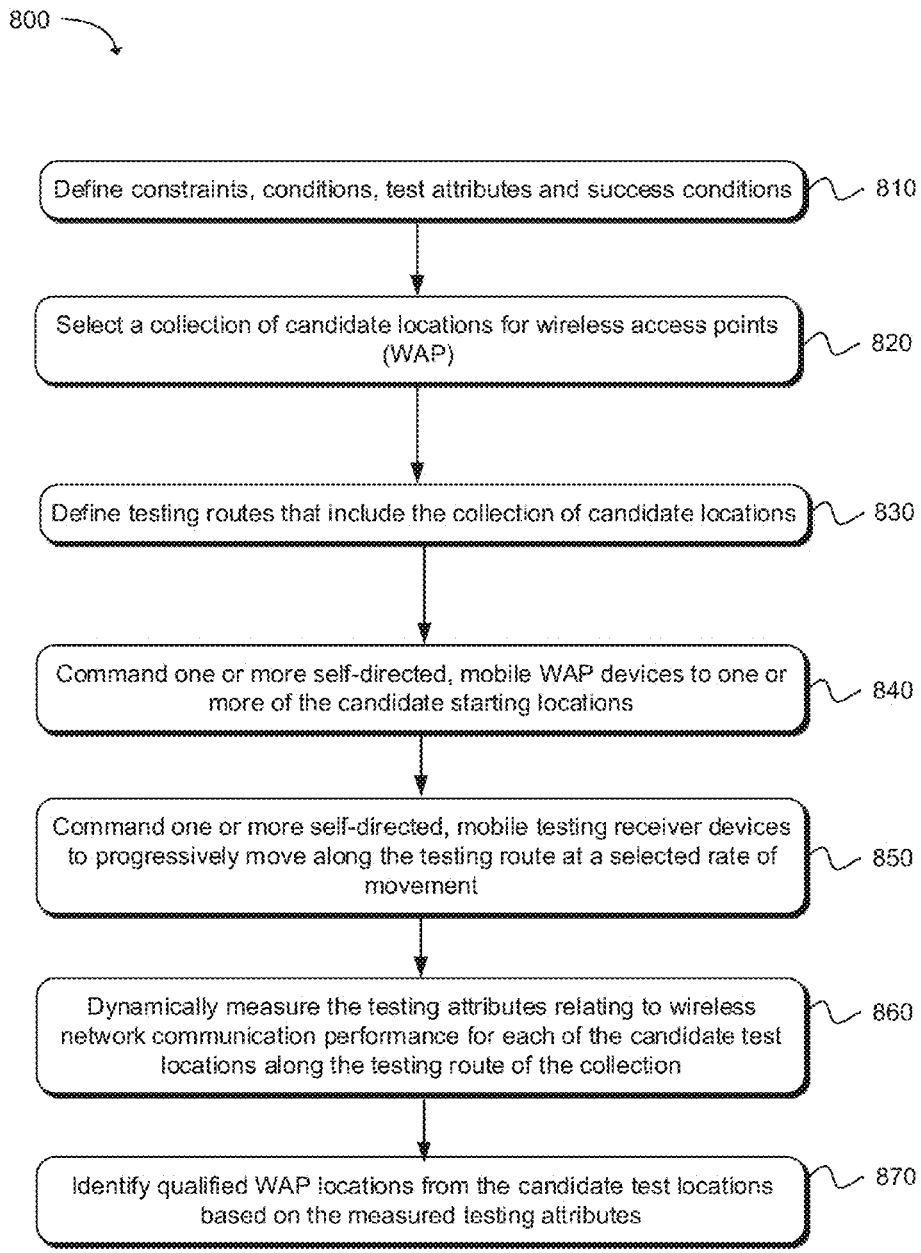
FIG. 8 is an additional flowchart diagram depicting an exemplary method for testing a wireless network location by a processor; again in which aspects of the present technology may be realized.

Turning now to FIG. 8, a flowchart of an example method 800 for testing a wireless network location for identifying location placement for a wireless access point (WAP) according to an example of the present technology. The functionality 800 may be implemented as a method and executed as instructions on a machine, where the instructions are included on at least one computer readable medium or one non-transitory machine-readable storage medium. For example, starting in block 810, one or more constraints, conditions, test attributes, and/or success conditions may be defined. A collection of candidate wireless network test locations may be selected for testing wireless network communication according to the defined constraints, conditions, testing parameters, or a combination thereof, as in block 820. One or more testing routes within a testing environment may be defined that include the collection of the selected candidate test locations, as in block 830. One or more self-directed, mobile WAPs, which may also include one or more self-directed, testing receivers, may be commanded to locate or re-locate to at least one candidate starting location, as in block 840. One or more self-directed, testing receivers may be commanded to progressively move to one or more candidate test locations along a testing route of the collection, as in block 850. One or more test attributes and success criteria may be dynamically measured relating to wireless network communication performance (e.g., radio signal strength or packet loss) for each of the candidate test locations along the testing route of the collection, as in block 860. One or more candidate or qualified WAP locations may be identified from the candidate test locations based on the measured testing attributes, as in block 870.

The present technology may be a system, a method, and/or a computer program product. The computer program product may include a computer readable storage medium (or media) having computer readable program instructions thereon for causing a processor to carry out aspects of the present technology.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technology.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present technology. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for testing a wireless network environment, comprising:
    selecting a collection of candidate wireless network test locations for testing wireless network communication according to defined constraints, conditions, testing parameters, or a combination thereof;
    dispatching a mobile wireless access point (WAP) to at least one stationary location from the collection;
    commanding a mobile receiver to progressively move to each candidate test location along a testing route of the collection;
    dynamically measuring the testing attributes relating to wireless network communication performance for each of the candidate test locations along the testing route of the collection; and
    identifying qualified WAP locations from the candidate test locations based on the measured testing attributes.

2. The method of claim 1, further including signaling the mobile WAP to perform a data transfer test with the mobile receiver, wherein the mobile WAP and the mobile receiver are drones and are self-directed.

3. The method of claim 1, further including defining a minimum physical distance between the mobile WAP and the mobile receiver, wherein the mobile WAP and the mobile receiver operate in a testing mode during the measuring and a wireless network communication link is established between the mobile WAP and the mobile receiver.

4. The method of claim 1, further including defining the constraints, conditions, testing parameters, such that reference is made to one or more of the defined constraints, conditions, and testing parameters when measuring the testing attributes relating to wireless network communication performance, wherein the wireless network communication is a wireless fidelity (Wi-Fi) communication system.

5. The method of claim 1, further including:
defining the testing route of the collection of the mobile receivers;
signaling the mobile WAP to transfer from the least one stationary location from the collection to at least one additional location for testing the wireless network communication; or
signaling the self-directed, testing receiver to perform a test operation with an existing WAP.

6. The method of claim 1, further including defining a rate of movement and a movement pattern for the mobile receiver to traverse along the testing route.

7. The method of claim 1, further including disqualifying those of the candidate test locations having measured testing attributes less than one or more testing attribute thresholds.

8. A system for testing a wireless network location, comprising:
one or more computers with executable instructions that when executed cause the system to:
select a collection of candidate wireless network test locations for testing wireless network communication according to defined constraints, conditions, testing parameters, or a combination thereof;
dispatch a self-directed, mobile receiving wireless access point (WAP) to at least one location from the collection;
command a self-directed, testing receiver to progressively move to each candidate test location along a testing route of the collection;
dynamically measure the testing attributes relating to wireless network communication performance for each of the candidate test locations along the testing route of the collection; and
identify qualified WAP locations from the candidate test locations based on the measured testing attributes.

9. The system of claim 8, wherein the executable instructions further signal the self-directed, mobile WAP to perform a data transfer test with the self-directed, testing receiver, wherein the self-directed, mobile WAP and the self-directed, testing receiver are drones.

10. The system of claim 8, wherein the executable instructions further define a minimum physical distance between the self-directed, mobile WAP and the self-directed, testing receiver, wherein the self-directed, mobile WAP and the self-directed, testing receiver operate in a testing mode during the measuring and a wireless network communication link is established between the self-directed, mobile WAP and the self-directed, testing receiver.

11. The system of claim 8, wherein the executable instructions further define the constraints, conditions, testing parameters, such that reference is made to one or more of the defined constraints, conditions, and testing parameters when measuring the testing attributes relating to wireless network communication performance, wherein the wireless network communication is a wireless fidelity (Wi-Fi) communication system.

12. The system of claim 8, wherein the executable instructions further:
define the testing route of the collection for the self-directed, testing receiver;
signal the self-directed, mobile WAP to transfer from the least one stationary location from the collection to at least one additional location for testing the wireless network communication; or
signal the self-directed, testing receiver to perform a test operation with an existing WAP.

13. The system of claim 8, wherein the executable instructions further define a rate of movement and a movement pattern for the self-directed, testing receiver to traverse along the testing route.

14. The system of claim 8, wherein the executable instructions further disqualify those of the candidate test locations having measured testing attributes less than one or more testing attribute thresholds.

15. A computer program product for, by a processor, testing a wireless network location, the computer program product comprising a non-transitory computer-readable storage medium having computer-readable program code portions stored therein, the computer-readable program code portions comprising:
an executable portion that selects a collection of candidate wireless network test locations for testing wireless network communication according to defined constraints, conditions, testing parameters, or a combination thereof;
an executable portion that dispatches a self-directed, mobile receiving wireless access point (WAP) to at least one location from the collection;
an executable portion that commands a self-directed, testing receiver to progressively move to each candidate test location along a testing route of the collection;
an executable portion that dynamically measures the testing attributes relating to wireless network communication performance for each of the candidate test locations along the testing route of the collection; and
an executable portion that identifies qualified WAP locations from the candidate test locations based on the measured testing attributes.

16. The computer program product of claim 15, further including an executable portion that signals the self-directed, mobile WAP to perform a data transfer test with the self-directed, testing receiver, wherein the self-directed, mobile WAP and the self-directed, testing receiver are drones.

17. The computer program product of claim 15, further including an executable portion that defines a minimum physical distance between the self-directed, mobile WAP and the self-directed, testing receiver, wherein the self-directed, mobile WAP and the self-directed, testing receiver operate in a testing mode during the measuring and a wireless network communication link is established between the self-directed, mobile WAP and the self-directed, testing receiver.

18. The computer program product of claim 15, further including an executable portion that defines the constraints, conditions, testing parameters, such that reference is made to one or more of the defined constraints, conditions, and testing parameters when measuring the testing attributes relating to wireless network communication performance, wherein the wireless network communication is a wireless fidelity (Wi-Fi) communication system.

19. The computer program product of claim 15, further including an executable portion that:
defines the testing route of the collection for the self-directed, testing receiver;
defines a rate of movement and a movement pattern for the self-directed, testing receiver to traverse along the testing route;
defines the testing route of the collection for the self-directed, testing receiver;

signals the self-directed, mobile WAP to transfer from the least one stationary location from the collection to at least one additional location for testing the wireless network communication; or signals the self-directed, testing receiver to perform a test operation by with an existing WAP.

20. The computer program product of claim 15, further including an executable portion that disqualifies those of the candidate test locations having measured testing attributes less than one or more testing attribute thresholds.

* * * * *